United States Patent Office 2,801,986
Patented Aug. 6, 1957

2,801,986

PROCESS OF PRODUCTION OF TANNING AGENTS IN SOLID FORM

Martin Meister, Leverkusen-Wiesdorf, and Gustav Mauthe, Opladen, Germany, assignors to Farbenfabriken Bayer Aktiengesellschaft, Leverkusen, Germany, a corporation of Germany No Drawing. Application January 15, 1953, Serial No. 331,486

Claims priority, application Germany January 18, 1952

12 Claims. (Cl. 260—45)

The present invention relates to a process of producing condensation products.

In copending application Ser. No. 241,693, filed August 13, 1951, there is described a process of producing new condensation products by condensing polyvalent phenols with aromatic or non-aromatic bases or ammonia or the salts thereof and aldehydes. According to the examples of said copending application the condensation products are obtained in the form of their concentrated aqueous solutions.

In accordance with the present invention we have found that, as a rule, the condensation products described in copending application Ser. No. 241,693 can be obtained in a solid form by carrying out the condensation in concentrated salt solutions the anions of which form soluble salts with the resulting condensation products. Alkali halides and nitrates may be used in this process; the reaction is preferably carried out in saturated or almost saturated sodium chloride solutions. When the concentration of the phenols and the salts of the bases employed in the reaction with the aldehyde is low the reaction proceeds very moderately. Consequently, the new process offers the advantage of a more convenient large scale production, especially of resorcinol condensation products, since it evades the considerable evolution of heat occurring according to previously known methods. The process is preferably performed with formaldehyde which is miscible with the concentrated salt solutions in all proportions; acetaldehyde may also be used.

Due to the strong sensitivity to electrolytes the condensation products precipitate rapidly in statu nascendi and thus evade further condensations. After completion of condensation the reaction mixture is slightly cooled, the salt solution, i. e. the sodium chloride solution according to the preferred embodiment of the invention, is decanted and the soft amorphous reaction mass is pressed while hot, referably mechanically. After this procedure the products contain less than 5–6 percent of sulfate ash and are water soluble in every proportion. By subsequently kneading the amorphous resins with a small quantity of water at higher temperatures the ash content can be minimized and the solubility increased. After the resins have completely been cooled they are hard-brittle and, in this form, are easy to handle and to shape. One may prepare soft or plastic resins, depending on the intended use, by increasing the amine content and/or decreasing the aldehyde quantity. Further small quantities of the condensation products can be recovered from the decanted cold sodium chloride solutions by careful addition of alkalies until a weak alkaline reaction occurs. After suction filtering the condensation products thus obtained are dissolved in the required quantity of hydrochloric acid.

The yields referred to the polyvalent phenols are good, practically quantitative.

A special, simplified and more economic embodiment of the invention—provided that resorcinol is used as the phenolic component—consists in employing the solutions of the alkali melts of benzene-1.3-disulfonic acid, which were rendered acid by means of hydrochloric acid, instead of starting from free, isolated phenol. According to this embodiment isolation and purification of resorcinol (extraction with ether, evaporation, distillation) is saved. Furthermore, the yield is improved by the implication and conversion into tannins of the otherwise non-utilized distillation residue.

The product obtained from the alkali melt is reacted with hydrochloric acid until the sulfite decomposes, and the precipitated sodium chloride is filtered off. Finally, the dissolved sulfur dioxide is removed, preferably by boiling. The content of crude resorcinol is determined by extracting a small test sample with ether or by evaporating a test sample to dryness and extraction with alcohol. The condensation is carried out in the manner described above by adding to 1 mol of the determined crude resorcinol at most 1 mol of the salt of a soluble aromatic or non-aromatic base or an ammonium halide and reacting with the required quantity of formaldehyde. Because of the greater dilution of resorcinol the reaction is only weakly exothermic. The reaction is eventually completed on the boiling water bath.

The solid and plastic condensation products thus obtained can be employed as tanning and retanning agents and are identical in their properties to the products products produced according to copending application Ser. No. 241,693, filed August 13, 1951, and now abandoned: solubility in alkalies and acids, insoluble intermediate stage near the neutral point, that means amphoteric in character and precipitation of anionic condensation products, e. g. tannins, due to their cationic character.

The condensation products obtained according to the new process may be used for tanning and retanning according to the method described in copending application Ser. No. 295,558, filed June 25, 1952, and now U. S. Patent No. 2,733,977.

The invention is further illustrated by the following examples without being restricted thereto.

Example 1

27 grams of ammonium chloride and 110 grams of resorcinol are dissolved in 300 to 1000 cc. of a warm, saturated or almost saturated, sodium chloride solution and reacted with 10 cc. of formaldehyde solution (30 percent) below 30° C. Precipitated sodium chloride dissolves again. The reaction mixture is slowly heated up in the water bath with good stirring; at a temperature above 40° C. turbidity and progressively increasing precipitation occur. The reaction proceeds weakly exothermally. The mixture is stirred in the boiling water bath for 1–1½ hours and slightly cooled, the salt solution is poured off and the precipitated amorphous reaction mass pressed while hot, preferably mechanically. The solubility of the resin in water is the better the more the product is freed from sodium chloride. If required, the product is washed with about 30 to 40 cc. of hot water. The yield amounts to a resin of hard and brittle quality. Softer resins are obtained when the aldehyde quantity is reduced.

Example 2

110 grams of resorcinol and 12 grams of ammonium chloride are dissolved in a quantity of warm saturated sodium chloride solution so as to give a volume of 750 cc. Sodium chloride separates to some degree. 84 cc. of formaldehyde solution (30 percent) are then added at 30° C., the separated sodium chloride dissolves and the solution is heated in the water bath with good stirring.

After turbidity has occurred separation progressively increases. The mixture is stirred in the boiling water bath for 1½ hours, the odor of aldehyde has long disappeared. The separated resin is pressed while rather warm, preferably mechanically.

The yield amounts to 182 grams of a mass which is hard and brittle at room temperature. As tannin the product shows the approximate analytical values:

| | |
|---|---|
| Concentration | 75 percent. |
| Tannins | 62.6 percent. |
| Percentage of pure tannin in dry substance | 83. |
| Acid number | 35. |
| pH value | 3.5. |
| Sulfate ash | 6 percent. |
| Weight of sample | 7 grams=4.3 grams of pure tannin per liter. |

For tannin analysis the solution is neutralized to about pH 5. This product gives especially beautiful and fully tanned leather which is excellently stable to hot water up to 90–95° C., i. e. far above the stability of quebracho.

*Example 3*

31 grams of ethanol amine dissolved in 550 cc. of saturated sodium chloride solution are adjusted slightly Congo acid with about 41 cc. of concentrated hydrochloric acid, 110 grams of resorcinol are dissolved therein and reacted with 10 cc. of formaldehyde solution (30 percent) at 30° C. The solution is slowly heated in the water bath with good stirring; from above 40° C. turbidity and increasing precipitation occur. After 1½ hours' heating in the boiling water bath the reaction mixture is allowed to cool and the resulting soft resin is pressed. More solid resins are obtained by reducing the quantity of ethanol amine hydrochloride and, correspondingly, also the aldehyde quantity, as well as by slightly increasing the aldehyde quantity while using constant quantities of amine.

*Example 4*

64 grams of aniline hydrochloride and 110 grams of resorcinol are dissolved in 600 cc. of hot saturated sodium chloride solution and 100 cc. of formaldehyde solution (30 percent) are poured in at 15° C. with water cooling. Precipitated sodium chloride disolves. As soon as the temperatures no longer raises due to the weakly exothermic reaction the mixture is heated in the water bath. Above 25° C. turbidity and rapidly increasing precipitation occur. The mixture is stirred in the boiling water bath for another hour. After slightly cooling and settling the solution is decanted and the warm resin well pressed. The yield amounts to 250° C. of a hard-brittle, easily soluble product.

*Example 5*

The solution of 110 grams of catechol and 12 grams of ammonium chloride in 70 cc. of saturated sodium chloride solution is reacted with 90–100 cc. of formaldehyde solution (30 percent) at 40° C. and heated in the boiling water bath with good stirring. After some minutes turbidity and increasing precipitation occur. After heating for about 6 hours the mixture is allowed to slightly cool and the precipitated amorphous products are pressed while warm. The yield amounts to 160–170 grams of an easily water-soluble product.

*Example 6*

110 grams of catechol and 25 grams of ethanol amine hydrochloride are dissolved in 700 cc. of saturated sodium chloride solution with evolution of heat, 110–120 cc. of formaldehyde solution and at about 50° C. 1½ cc. of hydrochloric acid (1:1) are added. Thereafter the mixture is heated in the boiling water bath, after 1–2 hours turbidity and increasing separation occur. After the odor of aldehyde has completely disappeared heating is continued for about 12–20 hours. After cooling the precipitated amorphous condensation product is pressed while warm. The product is easily soluble in water.

*Example 7*

The solution of 126 grams of pyrogallol and 32 grams of aniline hydrochloride in 700 cc. of saturated sodium chloride solution is reacted with 100–105 cc. of formaldehyde solution (30 percent) at 10° C.; the temperature slowly rises; after reaching 15° C. the solution is heated in the water bath; at about 25° C. turbidity and progressively increasing precipitation occur. After 2 hours' heating in the boiling water bath while continuously stirring the reaction mixture is allowed to slightly cool and the precipitated mass is well pressed while warm. The yield amounts to 245 grams of a plastic, brittle and easily water-soluble product.

Further small portions of the condensation products may be recovered from the cold spent liquors of Examples 1–7 by precipitating with low alkali until a weakly alkaline reaction occurs. These products are dissolved after filtering with hydrochloric acid.

*Example 8*

18.5 kilograms of a concentrated aqueous suspension of the alkali melt of benzene-1,3-disulfonic acid including the precipitated sodium sulfite are acidified with about 14 liters of concentrated hydrochloric acid to such an extent that Congo paper dyed blue markedly reacts Congo grey after standing in the air for 15 minutes. Precipitated common salt is separated by filtering. The filtrate (18–19 liters) has a pH value of 2.5.

1 liter contained 130 grams of crude resorcinol after extracting a sample with ether three times; 120 grams of pure resorcinol are obtained after distilling in vacuo.

It is possible to remove the crystallized sodium sulfite from the alkaline crude solution by filtering or centrifuging prior to acidification.

60 grams of ammonium chloride are stirred with 400 cc. of formaldehyde solution (30 percent) until complete dissolution occurs and then reacted with 4 liters of the above acid crude resorcinol solution. The solution is slowly heated up in the water bath with good stirring. At above 40° C. the solution becomes turbid, the precipitation progressively increases with increasing temperature until a slightly soft resin has formed in the boiling water bath. The mixture is heated in the boiling water bath for 1–1½ hours with good stirring; the odor of aldehyde soon disappears. Thereafter the mixture is allowed to slightly cool and the resin is well pressed at elevated temperature, preferably mechanically.

The yield amounts to 815 grams of a resin which is brittle after cooling and dissolves in water in every proportion.

The condensation may also be performed with 120 grams of ammonium chloride and 500 cc. of formaldehyde solution (30 percent) as well as with 40 grams of ammonium chloride and 350 cc. of formaldehyde solution (30 percent).

Small portions of the condensation product may additionally be recovered from the cooled, almost colorless residual solutions by careful addition of alkali until a weakly alkaline reaction occurs; these portions are dissolved in hydrochloric acid after filtering.

*Example 9*

15 kilograms of a concentrated aqueous solution of an alkali melt of benzene-1,3-disulfonic acid including the crystallized sulfite are adjusted just distinctly mineral acid with about 9 liters of concentrated hydrochloric acid, the precipitated sodium chloride is separated by filtering and 16 liters of the filtrate are measured off. The sulfurous acid is removed by boiling and the solution is made up again to 16 liters. The pH value is adjusted to 2.6 by addition of slightly concentrated alkali metal hydroxide solution. The analysis according to Example 8 results in 115 grams of crude resorcinol or 103 grams of pure resorcinol per liter.

60 grams of ammonium chloride are dissolved in 360 cc. of formaldehyde solution (30 percent) with stirring, 4 liters of the above solution are added and slowly heated up in the water bath with good stirring. The formation of the condensation product proceeds as described in Example 8; after heating in the boiling water bath for 1–1½ hours the resin is well pressed. The yield amounts to 757 grams.

If the resin is not soluble in all proportions due to occluded sodium chloride solution the resin is melted in the water bath with 100–150 cc. of water, well kneaded and well pressed again. This procedure does not involve any losses of the resin.

The condensation products obtained according to Examples 8–9 give particularly beautiful leather. The tanning process is completed between pH 5.5 and pH 7. Worthy of note is the excellent stability of the leather thus treated to hot water with a shrinking temperature of 90–95° C., i. e. far above that of quebracho. As tannins the products according to Examples 8 and 9 show the following analytical values:

|  | Example 8 | Example 9 |
| --- | --- | --- |
| Concentration_____percent__ | 75 | 74.5 |
| Tannins_____do____ | 63.3 | 55.7 |
| Percentage of pure tannin in dry substance____ | 81.2 | 74.7 |
| Acid number_____ | 35 | 36.6 |
| pH-value analytical strength_____ | 5.8 | 5.3 |
| Sulfate ash_____ | 2.6 | 5.35 |

For analysis according to the hide powder method the solution is neutralized to a pH of 5.0–5.5 with ammonia.

*Example 10*

110 grams of ethanol amine hydrochloride (or the corresponding quantities of the base and concentrated hydrochloric acid) are dissolved in 4 liters of the acid crude resorcinol solution of Example 9 and 365 cc. of formaldehyde solution (30 percent) are added at room temperature. The solution is slowly heated in the water bath with good stirring; above 40° C. turbidity and progressively increasing precipitation occur. After heating in the boiling water bath for 1–1½ hours the precipitated amorphous mass is well pressed while warm. Yield: 665 grams.

If the condensation product is not soluble in water in all proportions the product is purified with 150 cc. of water according to Example 9. The condensation product is hard-brittle.

*Example 11*

200 grams of aniline hydrochloride are dissolved in 4 liters of the acid, hot crude resorcinol solution of Example 9, cooled and reacted with 380 cc. of a likewise cooled formaldehyde solution at 10° C. with ice cooling and good stirring. After half a minute the solution has become turbid, cooling is stopped, the temperature rises slowly and from 20° C. the solution is slowly heated up in the water bath. Precipitation occurs more rapidly than according to Examples 8–10. If a test sample dissolved in water becomes turbid in the boiling water bath after 1 hour's heating and becomes clear upon addition of some drops of hydrochloric acid (1:1), some cubic centimeters of concentrated hydrochloric acid are added, the mixture is stirred for another some minutes and the precipitated condensation product well pressed after slightly cooling.

The yield amounts to 900 grams of a brittle, easily soluble resin. Turbid solutions become clear on standing upon addition of some drops of hydrochloric acid.

We claim:

1. The process of preparing tanning agents in solid form which comprises reacting in a concentrated aqueous solution of sodium chloride at a temperature up to about 100° C., a mixture containing a polyhydric phenol, a hydrochloric acid salt of a nitrogen-containing basic compound selected from the group consisting of aromatic amines, aliphatic amines, and ammonia, and an aliphatic, saturated aldheyde at least until the precipitate is water soluble.

2. The process as claimed in claim 1 wherein the salt of the nitrogen-containing basic compound is the aromatic amine hydrochloride.

3. The process as claimed in claim 1 wherein the aldehyde is formaldehyde.

4. The process of preparing tanning agents which comprises reacting in a concentrated aqueous solution of sodium chloride at a temperature up to about 100° C. a mixture of resorcinol, ammonium chloride and formaldehyde at least until the precipitate is water soluble.

5. The process of preparing tanning agents which comprises reacting in a concentrated aqueous solution of sodium chloride at a temperature up to about 100° C. a mixture of catechol, ammonium chloride and formaldehyde at least until the precipitate is water soluble.

6. The process of preparing tanning agents which comprises reacting in a concentrated aqueous solution of sodium chloride at a temperature up to about 100° C. a mixture of resorcinol, ethanol amine hydrochloride and formaldehyde at least until the precipitate is water soluble.

7. The process of preparing tanning agents which comprises reacting in a concentrated aqueous solution of sodium chloride at a temperature up to about 100° C. a mixture of catechol, ethanol amine hydrochloride and formaldehyde at least until the precipitate is water soluble.

8. The process of preparing tanning agents which comprises reacting in a concentrated aqueous solution of sodium chloride at a temperature up to about 100° C. a mixture of resorcinol, aniline hydrochloride and formaldehyde at least until the precipitate is water soluble.

9. The process as claimed in claim 1 wherein the polyhydric phenol is an aqueous solution of crude resorcinol obtained by dissolving an alkali melt of benzene-1,3-disulfonic acid in water, adding concentrated hydrochloric acid until a strong acid reaction is obtained and then removing the sulfur dioxide by boiling and the precipitated sodium chloride by filtering.

10. The process as claimed in claim 1, wherein the salt of the nitrogen-containing basic compound is an aliphatic amine hydrochloride.

11. The process as claimed in claim 1, wherein the salt of the nitrogen containing basic compound is ammonium chloride.

12. The process of preparing tanning agents in solid form which comprises reacting in a concentrated aqueous solution of a salt of the group consisting of alkali halides and alkali nitrates at a temperature up to about 100° C., a mixture containing a polyhydric phenol, a hydrochloride of an aromatic amine, and an aliphatic saturated aldehyde at least until the precipitate is water-soluble.

References Cited in the file of this patent

UNITED STATES PATENTS

| 1,711,411 | Guntzel _____ | Apr. 30, 1929 |
| 2,546,946 | Hartough et al. _____ | Mar. 27, 1951 |